(12) United States Patent
Wang

(10) Patent No.: US 7,512,479 B1
(45) Date of Patent: Mar. 31, 2009

(54) AIR FRACTION ESTIMATION FOR INTERNAL COMBUSTION ENGINES WITH DUAL-LOOP EGR SYSTEMS

(75) Inventor: Junmin Wang, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 15 days.

(21) Appl. No.: 11/942,453

(22) Filed: Nov. 19, 2007

(51) Int. Cl.
    *B60T 7/12* (2006.01)
    *F02M 25/07* (2006.01)
(52) U.S. Cl. .............. 701/103; 123/568.21; 123/568.23
(58) Field of Classification Search ................. 701/103, 701/104, 105, 115, 116; 123/434, 674, 568.11, 123/568.21, 568.23
See application file for complete search history.

(56) References Cited

U.S. PATENT DOCUMENTS

| | | | | |
|---|---|---|---|---|
| 5,465,617 A | * | 11/1995 | Dudek et al. ............. | 73/114.32 |
| 5,690,087 A | * | 11/1997 | Schumacher et al. ........ | 123/675 |
| 7,076,361 B2 | | 7/2006 | Wang et al. | |
| 7,128,063 B2 | * | 10/2006 | Kang ..................... | 123/568.14 |
| 2002/0152016 A1 | * | 10/2002 | Burgio et al. ............... | 701/108 |
| 2004/0084015 A1 | * | 5/2004 | Sun et al. .................... | 123/399 |
| 2008/0141765 A1 | * | 6/2008 | Naguib et al. ............ | 73/114.32 |

OTHER PUBLICATIONS

Junmin Wang; "Smooth In-Cylinder Lean-Rich Combustion Switching Control For Diesel Engine Exhaust-Treatment System Regenerations"; Copyright © 2008 SAR International (9 pgs).
Junmin Wang; "Air Fraction Estimation For Multiple Combustion Mode Diesel Engines With Dual-Loop EGR Systems"; Proceedings of 46th IEEE Conference on Decision and Control, 2007 (6 pgs).

* cited by examiner

*Primary Examiner*—John T Kwon
(74) *Attorney, Agent, or Firm*—Grossman, Tucker et al

(57) ABSTRACT

The present disclosure relates to a method and/or engine controller and/or article comprising a storage medium having stored thereon instructions that when executed by a machine estimate air fractions in internal combustion engines with dual-loop EGR (exhaust gas recirculation) systems for supporting multiple alternative combustion modes.

20 Claims, 5 Drawing Sheets

AIR FRACTION ESTIMATION FOR INTERNAL COMBUSTION ENGINES WITH DUAL-LOOP EGR SYSTEMS

FIELD OF THE INVENTION

This disclosure relates to a method, and/or engine controller and/or article comprising a storage medium having stored thereon instructions that when executed by a machine estimates air fractions in internal combustion engines with dual-loop EGR (exhaust gas recirculation) systems for supporting multiple alternative combustion modes.

BACKGROUND

Internal combustion engine emission regulations are becoming increasingly stringent. Using multiple combustion modes in internal combustion engines has been considered as a means to reduce emissions and to simultaneously maintain the functionality of the exhaust treatment systems. More sophisticated alternative combustion modes such as low temperature combustion (LTC), homogeneous charge compression ignition (HCCI), and premixed charge compression ignition (PCCI) are being developed and implemented on these engines along with conventional combustion in an attempt to meet emission regulations while maintaining desired performance levels.

Internal combustion engines may be understood to include both spark ignition (including direct ignition) and compression ignition (e.g., diesel) engines. Direct ignition may be understood as a type of spark ignition where each cylinder has a dedicated coil rather than energy from a single coil distributed to multiple cylinders. LTC may be understood to include combustion with a flame local temperature in the range of about 1400° K to about 2200° K (as compared to combustion with a flame local temperature in the range of about 1800° K to about 3600° K). PCCI may be understood to include ignition where fuel and air may be mixed prior to injection into a combustion chamber. HCCI may be understood to be a type of PCCI where the fuel and air mixture is relatively homogeneous at the time of ignition. It may be appreciated that LTC may produce relatively lower levels of nitrogen oxides ($NO_x$) and particulate matter than relatively higher temperature combustion. $NO_x$ may be understood to include NO and $NO_2$. As used herein, "about" may be understood to mean±10%.

In addition to alternative combustion modes, it is contemplated that alternative and/or additional fuels may also be used to optimize performance while reducing or maintaining engine-out emissions. For example, in addition to hydrocarbon fuels such as gasoline or diesel fuel. It may also include biodiesel (a diesel-equivalent processed fuel derived from biological sources such as vegetable oils) as well as other alternative fuels which are capable of combustion.

To reduce the engine-out emissions, exhaust gas recirculation (EGR) has been increasingly implemented on internal combustion engines. For some alternative combustion modes such as PCCI and HCCI, a dual-loop EGR system (e.g., a high-pressure loop and a low-pressure loop) may be desirable in order to offer a sufficient amount of EGR gas to control engine-out emissions. The properties of the EGR gases from the high-pressure loop and low-pressure loop may be different due to cooling and filtering effects. For example, the low-pressure loop may receive exhaust gas from downstream of a turbocharger and after-treatment so that such gas is relatively cool and relatively clean. The high-pressure loop, on the other hand, may receive exhaust gas from upstream of the turbocharger and after-treatment so that such gas is relatively warm and relatively unclean. Some engines may have both a low-pressure loop EGR and a high-pressure loop EGR system.

Dual-loop EGR systems may also enhance the operation of alternative combustion engines. Emission and control requirements of alternative combustion engines may vary with operating conditions, e.g., speed-load relationship. For example, the relatively higher temperature HP-EGR gas may help stabilize combustion for relatively light or low load conditions. Similarly, the relatively clean, filtered LP-EGR gas with high mass air flow rate may help reduce $NO_x$ emissions for relatively heavy or high load conditions.

The dual-loop EGR system may introduce challenges for an engine control system because of a lack of measurement of the EGR/air rate in the intake manifold and a lack of measurement of the ratio of high-pressure EGR gas to low-pressure EGR gas. It may therefore be desirable to estimate the air fractions in all intake and exhaust sections of an engine in order to provide closed-loop control of the EGR rate, high-pressure EGR amount and low-pressure EGR amount. Air fraction may be understood to mean the fraction of a measured gas that is air. An air fraction of one may correspond to 100% air and an air fraction of zero may correspond to 0% air.

For example, for diesel engines, combustion is generally complete and the air to fuel ratio is typically lean. Complete combustion may be understood to mean substantially all of the fuel is burned so no unburned fuel remains. Air to fuel ratio (AFR or $\lambda$) may be defined as the mass ratio of air to fuel present during combustion. As used herein, both AFR and $\lambda$ may be understood to mean the air to fuel ratio.

A stoichiometric mixture may be defined as chemically balanced, i.e., all the fuel is combined with all the oxygen. If the air-fuel ratio is greater than the stoichiometric amount, the mixture may be said to be lean, i.e., more air than fuel. Likewise, if the air-fuel ratio is less than the stoichiometric amount, the mixture may be said to be rich, i.e., more fuel than air. Accordingly, in a diesel engine, the air to fuel ratio is typically greater than the stoichiometric amount, i.e., lean. The exhaust gas may, therefore, contain unburned air that may be returned or recirculated to an intake manifold through one or more EGR systems. Because the combustion is generally complete, the exhaust gas may not contain unburned fuel.

SUMMARY

In a first exemplary embodiment, the present disclosure relates to a method for estimating air fractions in an internal combustion engine having an intake manifold, exhaust manifold, intercooler channel, compressor input channel and a dual-loop exhaust gas recirculation system, comprising:

(a) receiving information comprising pressure, temperature, mass air flow, fuel mass flow rate, exhaust gas air to fuel ratio, valve position and engine speed;

(b) generating output signals based upon said information and estimating:
air fraction ($\hat{F}_1$) in the intake manifold;
air fraction ($\hat{F}_2$) in the intercooler channel;
air fraction ($\hat{F}_3$) in the exhaust manifold; and
air fraction ($\hat{F}_4$) in the compressor input channel (c) comparing at least one of said estimated air fractions to a measured air fraction;

(d) determining a difference in at least one of said estimated air fractions to said measured air fraction; and (e) repeating steps (a)-(e) based upon the difference identified in step (d).

In a second exemplary embodiment, the present disclosure relates to an engine control unit for estimating air fractions in an internal combustion engine having an intake manifold, exhaust manifold, intercooler channel, compressor input channel and a dual-loop exhaust gas recirculation system, comprising a processor configured to:

(a) receive information comprising pressure, temperature, mass air flow, fuel mass flow rate, exhaust gas air to fuel ratio, valve position and engine speed;

(b) generate output signals based upon said information and estimating:

air fraction ($\hat{F}_1$) in the intake manifold;
air fraction ($\hat{F}_2$) in the intercooler channel;
air fraction ($\hat{F}_3$) in the exhaust manifold; and
air fraction ($\hat{F}_4$) in the compressor input channel (c) compare at least one of said estimated air fractions to a measured air fraction;

(d) determine a difference in at least one of said estimated air fractions to said measured air fraction; and (e) repeat steps (a)-(e) based upon the difference identified in step (d).

In a further exemplary embodiment, the present disclosure relates to an article comprising a storage medium having stored thereon instructions that when executed by a machine result in the following operations in an internal combustion engine having an intake manifold, exhaust manifold, intercooler channel, compressor input channel and a dual-loop exhaust gas recirculation system:

(a) receiving information comprising pressure, temperature, mass air flow, fuel mass flow rate, exhaust gas air to fuel ratio, valve position and engine speed;

(b) generating output signals based upon said information and estimating:

air fraction ($\hat{F}_1$) in the intake manifold;
air fraction ($\hat{F}_2$) in the intercooler channel;
air fraction ($\hat{F}_3$) in the exhaust manifold; and
air fraction ($\hat{F}_4$) in the compressor input channel (c) comparing at least one of said estimated air fractions to a measured air fraction;

(d) determining a difference in at least one of said estimated air fractions to said measured air fraction; and (e) repeating steps (a)-(e) based upon the difference identified in step (d).

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

In general, the present disclosure describes a system, method and/or article that may estimate air fractions in internal combustion engines with dual-loop EGR (exhaust gas recirculation) systems, in real time, for supporting multiple alternative combustion modes. The method may include linear parameter variation. The method may further include a Luenberger-like observer for estimating air fractions. An error function may be calculated between an observer output and an actual output for an intake manifold air fraction. The error may be shown to be asymptotically stable using a method of Lyapunov. Illustrative experimental results are provided for a low pressure EGR system and a dual loop EGR system for varying positions of a low pressure EGR valve.

Figure 1:
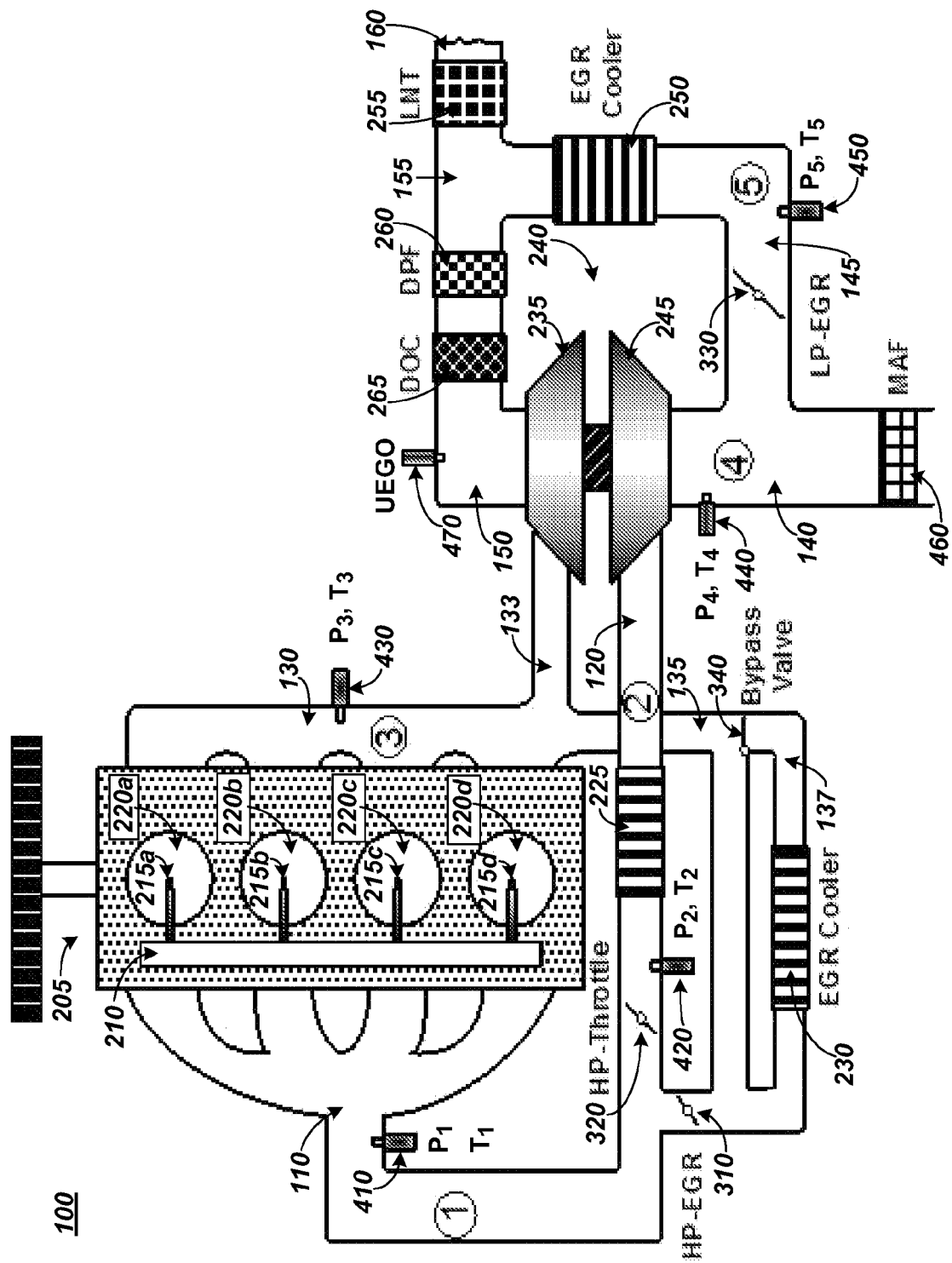
FIG. 1 depicts an illustrative schematic diagram of an embodiment of an internal combustion engine with a dual-loop EGR system.

Attention is directed to FIG. 1 which depicts an illustrative embodiment of a system 100 that may include an internal combustion engine 205, e.g., a compression ignition engine, with a dual-loop EGR system. The engine 205 may include four cylinders 220a, b, c, d. It may be appreciated that four cylinders are shown for illustrative purposes only and the present disclosure may apply to one or more cylinders in a given engine application.

In an embodiment, each cylinder 220a, b, c and d, may further have an associated fuel injector 215a, b, c, and d, respectively. Each fuel injector 215a, b, c, and d may be operatively connected to a common rail 210. The common rail 210 may be connected to a fuel supply (not shown) and may supply fuel relatively continuously to each injector 215a, b, c, d. Each injector 215a, b, c, d may then individually regulate the fuel provided to each cylinder 220a, b, c and d. It may be appreciated that the fuel provided to a cylinder may be mixed with air and/or EGR gas prior to being provided to the cylinder, e.g., as in HCCI discussed above.

The engine 205 may receive air and/or EGR gas via an intake manifold 110. The intake manifold 110 may be connected to each cylinder 220a, b, c, d through an associated valve or valves (not shown). The intake manifold 110 may further be connected to each fuel injector 215a, b, c, d at or near its respective cylinder 220a, b, c, d. The intake manifold 110 may be further connected to both the high pressure and low pressure EGR systems. Exhaust manifold 130 may receive exhaust gas from the engine 205 and may provide this exhaust gas to a variable geometry turbocharger 240 and/or the high pressure EGR system.

A turbocharger may be understood to mean a turbine and a compressor that may be coupled by a shaft. A gas flow, e.g. exhaust gas, may cause the turbine to rotate which may then activate the compressor. Incoming air and/or EGR gas to the compressor may then be compressed and forced out of the compressor into, e.g., an intake manifold, and thereby into one or more cylinders. It may be appreciated that a variable geometry turbocharger may allow one or more parameters of the turbocharger, e.g., turbine vane angle, to be varied. This variable geometry may then allow relatively more uniform compressor output over a range of engine speeds. This relatively more uniform output may be accomplished by maintaining a relatively uniform turbine, shaft and compressor rotational speed.

The high pressure EGR system may include the exhaust manifold 130 that may be coupled to HP-EGR channel 135. Bypass valve 340 may couple the HP-EGR channel 135 to alternate channel 137 at a first location. Alternate channel 137 may pass through HP-EGR cooler 230 and may be further coupled to HP-EGR channel 135 at a second location near HP-EGR valve 310. The HP-EGR valve 310 may regulate the flow of air and/or exhaust gas between HP-EGR channel 135 and the intake manifold 110. The position of bypass valve 340 may determine whether air and/or EGR gas flows from HP-EGR channel 135 to alternate channel 137 then through the EGR cooler 230 to HP-EGR valve 310 or flows through HP-EGR channel 135 directly to HP-EGR valve 310, bypassing EGR cooler 230. Accordingly, an HP-EGR loop may include HP-EGR channel 135 and HP-EGR valve 310. An HP-EGR loop may also include HP-EGR channel 137 and HP-EGR cooler 230, depending on the position of bypass valve 340. Therefore, the gas in the HP-EGR loop may include air and/or unfiltered exhaust gas. Depending on the position of the bypass valve 340, the air and/or unfiltered exhaust gas may be relatively hot. The HP-EGR valve 310 may then regulate the amount of unfiltered and possibly relatively hot air and/or exhaust gas provided to the intake manifold 110.

The low pressure EGR system may also include the exhaust manifold 130. The exhaust manifold 130 may be coupled to turbine channel 133. Turbine channel 133 may be coupled to turbine 235 and turbine 235 may be coupled to DOC channel 150. DOC channel 150 may include diesel oxidation catalyst (DOC) 265 and diesel particulate filter (DPF) 260. A DOC may be understood to include an exhaust gas treatment device that may use excess oxygen in an exhaust gas to oxidize carbon monoxide into carbon dioxide and hydrocarbons into water and carbon dioxide. A DPF may be understood to mean an exhaust gas treatment device that may filter and/or remove diesel particulate matter and/or soot from the exhaust gas.

DOC channel 150 may be coupled to T channel 155 and T channel 155 may be coupled to LP-EGR channel 145. LP-EGR channel 145 may include LP-EGR cooler 250 and LP-EGR valve 330. LP-EGR channel 145 may be coupled to compressor input channel 140 that may be coupled to compressor 245. Compressor 245 may be coupled to intercooler channel 120 that may be coupled to intake manifold 110. Intercooler channel 120 may include intercooler 225 and HP-throttle 320. HP-throttle 320 may regulate the amount of air and/or exhaust gas provided to the intake manifold 110 by the LP-EGR system.

In an embodiment, HP-throttle 320 may reduce the pressure in the intake manifold 110 and may increase HP-EGR air and/or EGR gas flow rate at light load for alternative combustion modes. For example, at light loads, HP-throttle 320 may be closed or closing and during heavy loads, HP-throttle may be fully open. HP-throttle 320 may enhance system 100 operation for alternate combustion modes.

Compressor input channel 140 may further include a mass air flow sensor (MAF) 460 that may sense ambient air flow into compressor input channel 140 and, therefore, into compressor 245. T channel 155 may be further coupled to a lean $NO_x$ trap (LNT) 255 that may be coupled to exhaust channel 160 that may finally exhaust to ambient air. A LNT may be understood to mean a device that adsorbs and traps $NO_x$ molecules.

The system 100 may also include a plurality of sensors 410, 420, 430, 440, 450 that may sense temperature and/or pressure in sections of the system 100. The sensors may be positioned in various locations in the system 100. For example, in an embodiment, sensor 420 may be positioned in intercooler channel 120 between intercooler 225 and compressor 245. In another embodiment, sensor 420 may be positioned in intercooler channel 120 between intercooler 225 and HP-throttle 320. The locations of the sensors 410, 420, 430, 440, and 450 depicted in FIG. 1 are for illustrative purposes only. In other embodiments, the locations of the sensors may depend on the engine being modeled. In other words, while the particular locations of the sensors may depend on the engine being modeled, it is contemplated that the model may accommodate a variety of sensor locations.

The system may further include a universal exhaust gas oxygen sensor (UEGO) 470 that may be positioned in DOC channel 150 between the turbine 235 and the DOC 265. Similar to the plurality of temperature and/or pressure sensors, in other embodiments, the UEGO 470 may be positioned elsewhere in the system 100. It may be appreciated that the UEGO 470 may be located between the exhaust manifold 130 and a tail pipe (not shown).

It may be appreciated that the air and/or EGR gases provided to the intake manifold 110 by the HP-EGR system and LP-EGR system may be quite different. For example, the HP-EGR loop receives air and/or EGR gas directly from the exhaust manifold 130. Accordingly, this air and/or EGR gas may contain relatively hot unburned air and/or relatively hot unfiltered EGR gas that may include $NO_x$ and diesel particulates. This air and/or EGR gas may or may not pass through EGR cooler 230, depending on the position of the bypass valve 340.

The LP-EGR loop receives air and/or EGR gas that has passed through the turbine 235 (and done work), and that has been filtered by the DOC 265 and the DPF 260. The air and/or filtered EGR gas may then pass through EGR cooler 250 and may mix with ambient air in compressor input channel 140. The mix of ambient air and air and/or filtered EGR gas may then be compressed in the compressor 245. The compressed air and/or filtered EGR gas may then pass through intercooler 225. The compressed and cooled air and/or filtered EGR gas may be regulated by HP-throttle 320 and may then be provided to the intake manifold 110. Accordingly, this air and/or filtered EGR gas may contain a relatively larger fraction of ambient air and a relatively smaller fraction of exhaust gas than the air and/or EGR gas provided by the HP-EGR system.

It may be desirable to control the air fractions in the engine intake section, e.g., 110 as a way to control the amount of EGR gas in the engine cylinders 220a, b, c, d. Such control may be accomplished by closed loop process control, as discussed more fully herein. For example, for system 100, the air fraction in compressor input channel 140, i.e., the input to the compressor 245 (section 4), may indicate the LP-EGR rate and the air fraction in the intake manifold 110, i.e., section 1, may indicate the total EGR rate contributed by both the HP-EGR system and the LP-EGR system.

The aforementioned closed loop control may provide better real-time control of relevant air fractions relative to, e.g., open loop control that does not rely upon feedback data and is targeted to hit certain set points. Engine parameters that may not be measurable but otherwise utilized in the closed-loop control herein may be estimated using a Luenberger-like observer. The observer may be shown to be asymptotically stable using a method of Lyapunov. The observer herein has been validated on a test engine that includes a dual-loop EGR system.

First, certain parameter/variables may be defined as follows:

$F_i$≡air fraction (unitless) [0~1]
$F_i^{\&}$≡time rate of change of air fraction ($s^{-1}$)
R≡universal gas constant=0.287 (J/kg/° K)
$T_i$≡temperature (° K)
$p_i$≡pressure (kPa)
$V_i$≡volume ($m^3$)
W≡mass (air, gas and/or fuel) flow rate (kg/s)
$\eta_v$≡engine volumetric efficiency (unitless) [0~1]
$\eta$≡efficiency (unitless) [0~1]
$\lambda$≡air to fuel ratio (unitless)

γ=ratio of specific heats: $c_p/c_v$ (unitless)
$N_e$=engine speed (rpm)
$V_d$=engine displacement (m$^3$)
$u_v$=valve position (unitless) [0~100] (open to closed)

An engine system, e.g., illustrative system 100, may be modeled mathematically. The model may be based on the ideal gas law and conservation of mass. The following four equations may describe the dynamic relationship of air fractions in the four sections, labeled 1, 2, 3 and 4 in FIG. 1. The four sections, i.e., 1, 2, 3 and 4, correspond to intake manifold 110, intercooler channel 120, exhaust manifold 130, and compressor input channel 140, respectively. Numerical subscripts correspond to these sections of the illustrative system 100. The dynamics of the air fractions may be described as:

$$\dot{F}_1 = \frac{RT_1}{p_1 V_1}[(F_2 - F_1)W_{HT} + (F_3 - F_1)W_{HEGR}] \quad (1)$$

$$\dot{F}_2 = \frac{RT_2}{p_2 V_2}(F_4 W_{ce} - F_2 W_{HT}) \quad (2)$$

$$\dot{F}_3 = \frac{RT_3}{p_3 V_3} W_{eo}(F_{eo} - F_3) \quad (3)$$

$$\dot{F}_4 = \frac{RT_4}{p_4 V_4}[W_{LEGR} F_3 + W_{MAF} - W_{ce} F_4] \quad (4)$$

where,
$W_{HT}$=air and/or EGR gas flow rate across HP—throttle 320,
$W_{HEGR}$=air and/or EGR gas flow rate across HP—EGR valve 310,
$W_{ce}$=air and/or EGR gas flow rate through compressor 245,
$W_{eo}$=air and/or gas flow rate coming out of cylinders 220a, b, c, d,
$F_{eo}$=air fraction coming out of the cylinders 220a, b, c, d,
$W_{LEGR}$=air and/or EGR gas flow rate across LP—EGR valve 330, and
$W_{MAF}$=air flow rate measured by mass air flow sensor 460.

$W_{eo}$, the air and/or gas flow rate coming out of the cylinders 220a, b, c, d may be calculated as:

$$W_{eo} = W_e + W_f \quad (5)$$

where,
$W_e$=intake manifold 110 air and/or EGR gas flow rate, and
$W_f$=fuel mass flow rate.

In words, the air and/or gas flow rate out of the cylinders 220a, b, c, d, may be equivalent to the sum of the air and/or gas flow rate into the cylinders 220a, b, c, d, from the intake manifold 110 plus the fuel mass flow rate into the cylinders 220a, b, c, d, from the common rail system 210 (via the injectors 215a, b, c, d). It may be appreciated that any residual burned gases that may be present inside a cylinder, e.g., cylinder 220a, b, c, or d, may be ignored. In other words, mass is conserved. It may be further appreciated that combustion may be complete.

The intake manifold 110 air and/or EGR gas flow rate, $W_e$, may be calculated using the speed-density equation yielding:

$$W_e = \frac{\eta_v p_1 N_e V_d}{RT_1 120}. \quad (6)$$

The engine volumetric efficiency, $\eta_v$, may be determined and/or calibrated for a range of operating conditions. In other words, a range of volumetric efficiency values may be provided a priori as a function of operating conditions.

The air fraction coming out of the cylinder, $F_{eo}$, may be estimated based on the fuel mass flow rate, $W_f$, and a stoichiometric air to fuel ratio, $\lambda_s$, as:

$$F_{eo} = \frac{W_e F_1 - W_f \lambda_s}{W_e + W_f} = \frac{W_f(\lambda_m - \lambda_s)}{W_e + W_f} \quad (7)$$

where,
$\lambda_m$=measured exhaust gas air to fuel ratio. As used herein, AFR, (air to fuel ratio) may be used interchangeably with λ.

Equation (7) may then be solved for $F_1$, the intake manifold air fraction, as a function of the measured exhaust gas air to fuel ratio, the fuel mass flow rate and the intake manifold 110 air and/or gas flow rate, to yield:

$$F_1 = \frac{W_f \lambda_m}{W_e} \quad (8)$$

The measured exhaust gas air to fuel ratio, $\lambda_m$, may be determined based on the amount of oxygen that may be present in the exhaust gas. The amount of oxygen in the exhaust gas may be measured by a universal exhaust gas oxygen sensor, e.g., UEGO 470. Using this measured amount of oxygen, the exhaust gas air to fuel ratio may then be determined.

It may be appreciated that there may be a time delay associated with the measured and/or calculated exhaust gas air to fuel ratio provided by UEGO 470. This time delay may be the result of the location of the UEGO 470 and/or internal sensor dynamics. In other words, there may be a delay (e.g., travel time) between the exhaust manifold 130 and the location of UEGO 470 for an exhaust gas to be detected. There may be a further delay to account for the time required for the UEGO 470 to acquire a reading. In the discussion below, an observer was used to estimate the exhaust gas air to fuel ratio assuming a fixed sensor response time.

Referring to FIG. 1, it may be appreciated that the UEGO sensor 470 may be located in a section labeled 5, between the turbine 235 and the LP-EGR valve 330. It may be further appreciated that the turbine 235, the DOC 265, the DPF 260 and the LP-EGR cooler 250 may affect air fraction dynamics in this section. For example, exhaust treatment components, e.g., DOC 265 and DPF 260, may produce reductions in pressure of the air and/or exhaust gas that flows through them. Similarly, the LP-EGR cooler 250 may reduce the temperature of the air and/or exhaust gas that may flow through it. Accordingly, the effects of these components on the air fraction dynamics may be relatively complex.

However, the air fraction in this section may typically be relatively low. As a result, the dynamics of this section may be ignored without introducing noticeable estimation error. Accordingly, the air fraction in the exhaust manifold, $F_3$, may be assumed to be equivalent to the air fraction, $F_5$, in the channel 145 between the LP-EGR cooler 250 and the LP-EGR valve 330.

The mass air and/or EGR gas flow rate, $W_{ce}$, through the compressor 245 may be approximated as:

$$W_{ce} = \frac{W_{MAF}T_{MAF} + W_{LEGR}T_{LEGR}}{T_C} \quad (9)$$

where, $T_C$=temperature of the compressor 245,
$W_{MAF}$=mass air flow rate at the mass air flow sensor 460,
$T_{MAF}$=temperature at the mass air flow sensor 460,
$W_{LEGR}$=mass air and/or EGR gas flow rate through the LP-EGR valve 330, and
$T_{LEGR}$=temperature at the LP-EGR valve 330.

It may be appreciated that $W_{ce}$ may be an approximation to the mass air and/or EGR gas flow rate out of the compressor. It may be appreciated that compressing air and/or gas may cause an associated increase in air and/or gas temperature. Accordingly, equation (9) may account for any such increase in air and/or EGR gas temperature with the inclusion of the temperature terms.

In an embodiment, the mass air and/or EGR gas flow rates through the valves (e.g., LP-EGR valve 330, HP-EGR valve 310, HP-throttle 320) may be calculated using an orifice equation:

$$W_v = \begin{cases} A_v(u_v)\frac{p_u}{\sqrt{RT_v}}\left[\gamma^{\frac{1}{2}}\left(\frac{2}{\gamma+1}\right)^{\frac{\gamma+1}{2(\gamma-1)}}\right], & \frac{p_d}{p_u} \leq \left(\frac{2}{\gamma+1}\right)^{\frac{\gamma+1}{2(\gamma-1)}} \\ A_v(u_v)\frac{p_u}{\sqrt{RT_v}}\sqrt{\frac{2\gamma}{\gamma-1}\left[\left(\frac{p_d}{p_u}\right)^{\frac{2}{\gamma}} - \left(\frac{p_d}{p_u}\right)^{\frac{\gamma+1}{\gamma}}\right]}, & \frac{p_d}{p_u} > \left(\frac{2}{\gamma+1}\right)^{\frac{\gamma+1}{2(\gamma-1)}} \end{cases} \quad (10)$$

where, $W_v$=mass air and/or EGR gas flow rate through valve,
$A_v(u_v)$=effective area of valve as a function of valve position $u_v$,
$T_v$=temperature at valve,
$p_u$=pressure upstream from valve,
$p_d$=pressure downstream from valve,
R=universal gas constant, and
$\gamma$=ratio of specific heats.

In other embodiments, other mass gas flow estimation equations and/or models may be used.

Continuing with equation (10), the effects of the coolers (e.g., LP-EGR cooler 250, HP-EGR cooler 230 and intercooler 225) on the air and/or EGR gas temperature may also be approximated. In an embodiment, the effects of the coolers may be approximated using linear heat exchanger effectiveness, upstream air and/or EGR gas temperature and engine coolant temperature, $T_{coolant}$. A general equation may be written as:

$$T_{down} = \eta_{he}T_{coolant} + (1-\eta_{he})T_{up} \quad (11)$$

where, $T_{down}$=air and/or EGR gas temperature downstream from cooler,
$T_{up}$=air and/or EGR gas temperature upstream from cooler, and
$\eta_{he}$=efficiency of cooler heat exchanger.

Accordingly, for the three coolers (i.e., LP-EGR cooler 250, HP-EGR cooler 230 and intercooler 225), the specific equations may be written as:

$$T_{HP-EGR} = \begin{cases} \eta_{ec}T_{coolant} + (1-\eta_{ec})T_3, & \text{with HP-EGR cooler} \\ T_3, & \text{HP-EGR cooler bypassed} \end{cases} \quad (12)$$

$$T_{LP-EGR} = \eta_{ec}T_{coolant} + (1-\eta_{ec})T_3 \quad (13)$$

$$T_{HT} = \eta_{ic}T_{coolant} + (1-\eta_{ic})T_2 \quad (14)$$

where, $T_{HP-EGR}$=air and/or EGR gas temperature at the HP-EGR valve 310,
$T_{LP-EGR}$=air and/or EGR gas temperature at the LP-EGR valve 330,
$T_{HT}$=air and/or EGR gas temperature at the HP-throttle 320,
$\eta_{ec}$=efficiency of an EGR cooler (e.g., LP-EGR cooler 250, HP-EGR cooler 230) heat exchanger, and
$\eta_{ic}$=efficiency of the intercooler (e.g., intercooler 225) heat exchanger.

The temperature of air and/or EGR gas at the HP-EGR valve 310 may depend on the position of the bypass valve 340. The bypass valve 340 may switch the HP-EGR cooler 230 in or out of the HP-EGR loop. When the bypass valve 340 is in a first position, air and/or EGR gas may flow through the HP-EGR cooler 230 and may thereby be cooled. In this configuration, the temperature of air and/or EGR gas at the HP-EGR valve 310 may be approximated by the upper portion of equation (12). When the bypass valve 340 is in a second position, air and/or EGR gas may bypass the HP-EGR cooler 230. In this configuration, the temperature of the air and/or EGR gas at the HP-EGR valve 310 may be approximated by $T_3$, the temperature in the exhaust manifold 130.

In an embodiment, the temperature of the air and/or EGR gas at the LP-EGR valve 330 may be approximated by equation (13). It may be appreciated that any reduction in temperature that may occur as the exhaust gas passes through the turbine 235 and the exhaust treatment elements, DOC 265 and DPF 260, has been ignored. Such effect on exhaust gas temperature may be relatively small compared to the temperature reduction that may be effected by the LP-EGR cooler 250. In another embodiment, the temperature of the air and/or EGR gas at the LP-EGR valve 330 may be measured by a temperature sensor, e.g., sensor 450, as $T_5$.

In an embodiment, the temperature of the air and/or EGR gas at the HP-throttle 320 may be approximated by equation (14). It may be appreciated that in this embodiment, the temperature sensor 420 may be located upstream from the intercooler 225, e.g., between the intercooler 225 and the compressor 245 in intercooler channel 120. In another embodiment, e.g., as depicted in FIG. 1, temperature sensor 420 may be located downstream of the intercooler 225, between the intercooler 225 and the HP-throttle 320. In this embodiment, rather than using equation (14) to calculate the temperature at the HP-throttle 320, the temperature at the HP-throttle 320 may be measured by temperature sensor 420 as $T_2$.

Attention is directed to equations (1) through (4) above. In an embodiment, the temperatures (i.e., $T_1$, $T_2$, $T_3$, $T_4$) and pressures (i.e., $p_1$, $p_2$, $p_3$, $p_4$) may be measured, in real time, by sensors, e.g., sensors 410, 420, 430, 440. Volumes, (i.e., $V_1$, $V_2$, $V_3$, $V_4$) may be determined for a particular engine system and the universal gas constant, R, may be known. In an embodiment, $W_{MAF}$ may be measured by an existing sensor, e.g., MAF 460, and the fuel mass flow rate, $W_f$, may also be measured and/or known. The remaining coefficients may be calculated and/or measured using equations (5) through (14) and any measured values.

As noted above, equations (1) through (4) may represent the dynamics of the air fractions in four sections of an internal combustion engine system, e.g., system 100. It may be appreciated that equations (1) through (4) are a system of first order differential equations with time varying coefficients. This system may be considered a linear parameter-varying system. In order to exercise closed-loop control of the engine system 100, it may be desirable to solve this system of equations.

Equations (1) through (4) may be rewritten in state space form. For notational simplicity, the following relationships may be defined:

$$k_4 = \frac{RT_1}{p_1 V_1}, k_5 = \frac{RT_4}{p_4 V_4}, k_6 = \frac{RT_3}{p_3 V_3}, k_7 = \frac{RT_2}{p_2 V_2}. \quad (15)$$

Equations (1) through (4) may then be written in state space form as:

$$\begin{pmatrix} \dot{F}_3 \\ \dot{F}_4 \\ \dot{F}_2 \\ \dot{F}_1 \end{pmatrix} = \begin{pmatrix} -k_6 W_{eo} & 0 & 0 & 0 \\ k_5 W_{LEGR} & -k_5 W_{ce} & 0 & 0 \\ 0 & k_7 W_{ce} & -k_7 W_{HT} & 0 \\ k_4 W_{HEGR} & 0 & k_4 W_{HT} & -k_4 (W_{HT} + W_{HEGR}) \end{pmatrix} \begin{pmatrix} F_3 \\ F_4 \\ F_2 \\ F_1 \end{pmatrix} + \begin{pmatrix} k_6 W_{eo} F_{eo} \\ k_5 W_{MAF} \\ 0 \\ 0 \end{pmatrix}. \quad (16)$$

As noted above, $F_1$, the intake manifold 110 air fraction, may be calculated using measurements and equation (8). $F_1$ may therefore be treated as system output:

$$z = F_1 = (0\;0\;0\;1)(F_3\;F_4\;F_2\;F_1)^T. \quad (17)$$

Equations (16) and (17) may then be written in matrix-vector form as:

$$\dot{g} = A(\rho)g + W(\rho) \quad (18)$$

$$z = F_1 = Cg \quad (19)$$

where, $$\dot{g} = \begin{pmatrix} \dot{F}_3 \\ \dot{F}_4 \\ \dot{F}_2 \\ \dot{F}_1 \end{pmatrix}, \quad (20)$$

$$A(\rho) = \begin{pmatrix} -k_6 W_{eo} & 0 & 0 & 0 \\ k_5 W_{LEGR} & -k_5 W_{ce} & 0 & 0 \\ 0 & k_7 W_{ce} & -k_7 W_{HT} & 0 \\ k_4 W_{HEGR} & 0 & k_4 W_{HT} & -k_4 (W_{HT} + W_{HEGR}) \end{pmatrix},$$

$$g = \begin{pmatrix} F_3 \\ F_4 \\ F_2 \\ F_1 \end{pmatrix}, W(\rho) = \begin{pmatrix} k_6 W_{eo} F_{eo} \\ k_5 W_{MAF} \\ 0 \\ 0 \end{pmatrix}, C = (0\;0\;0\;1), \text{ and }$$

$$\rho = (k_4\;k_5\;k_6\;k_7\;W_{eo}\;W_{LEGR}\;W_{ce}\;W_{HEGR}\;W_{HT}\;F_{eo}\;W_{MAF})^2.$$

It may be appreciated that the elements of $\rho$ may vary as an engine system, e.g., system 100, is operated. It may be further appreciated that this variation may occur over time. As discussed above, the elements of $\rho$ may be measurable and/or calculable based on signals that may be available from sensors that may be in and/or on the engine system 100. Accordingly, equations (16) through (20) may be considered a linear parameter-varying (LPV) system. $\rho$ may be considered the parameter vector of the LPV system.

It may be appreciated that in order to control in-cylinder HP-EGR and LP-EGR gas amounts, it may be desirable to maintain air fractions in sections 1, 2 and 4 (i.e., intake manifold 110, intercooler channel 120, and compressor input channel 140) at or near predetermined values. These predetermined values may vary with engine operating conditions. For example, these predetermined values may depend on whether the engine system is operating under light load, normal load or heavy load conditions. In general, these air fractions may not be directly measurable so observer-based estimation may then be used.

Attention is again directed to the embodiment of an engine system, e.g., system 100 depicted in FIG. 1, whose air fraction dynamics may described by equations (16) through (20). It may be appreciated that not all of the air fractions may be directly measurable. Accordingly, a Luenberger-type observer may be designed to estimate the air fractions in sections 1, 2, 3 and 4, in real time, for a fixed engine operating condition. Sections 1, 2, 3 and 4 may correspond to intake manifold 110, intercooler channel 120, exhaust manifold 130 and compressor input channel 140, respectively. Observer may be understood to mean a model of a system (e.g., engine system 100) that may be configured to (1) receive signals representing inputs to the system, (2) generate output signal or signals based on those input signals, (3) compare the generated output signal or signals to signal or signals representing actual output or outputs and (4) use the difference between the generated output signal and actual output signal to calibrate the model.

A Luenberger-type observer may be defined as:

$$\dot{\hat{g}} = A(\rho)\hat{g} + W(\rho) + L(\rho)(z - \hat{z}), \quad (21)$$

$$\hat{z} = C\hat{g} \quad (22)$$

where, $\hat{g} = (\hat{F}_3\;\hat{F}_4\;\hat{F}_2\;\hat{F}_1)^T$ the estimated air fraction vector, $L(\rho) = (k_4 W_{HEGR}\;0\;k_4 W_{HT}\;l_4)^T, l_4 > 0 \equiv$ the observer gain vector, and $\hat{z} \equiv$ the estimated output.

It may be appreciated that the estimated output, $\hat{z}$, may be equal to $\hat{F}_1$. It may be further appreciated that $l_4$ may be adjusted by a user so that asymptotic stability may be achieved. For example, in the experimental results discussed below, $l_4$ was about 10.

Having defined an observer, it may be desirable to determine whether and/or under what conditions the observer may be stable. It may be desirable for an observer to be asymptotically stable. Asymptotically stable may be understood to mean that the difference between observer estimated values and corresponding system values approach zero as time approaches infinity. In other words, the observer estimation errors may approach zero as time approaches infinity.

One method of determining asymptotic stability may be a method of Lyapunov. To determine whether the estimation errors may be asymptotically stable using a method of Lyapunov, a Lyapunov function candidate, $V_o$, for the estimation errors may be chosen. The estimation errors may be asymptotically stable if the Lyapunov function candidate is positive definite and radially unbounded and its first derivative, $V_o^{\&}$, is negative definite. Positive definite may be understood to describe a function, f(x), that is equal to zero for x=0 and that is greater than zero for x≠0. It may be appreciated that x may be a vector or a scalar. Radially unbounded may be understood to describe a function, f(x), that approaches infinity as |x| approaches infinity. Similarly, negative definite may be understood to describe a function g(x) that is equal to zero for x=0 and that is less than zero for x≠0.

For the observer defined in equations (21) and (22), estimation errors may be defined as:

$$\tilde{g} = g - \hat{g}, \quad (23)$$

and the dynamics of the estimation errors may be given by:

$$\tilde{g}^{\&} = g^{\&} - \hat{g}^{\&} = A(\rho)(g-\hat{g}) - L(\rho)(z-\hat{z}) = A(\rho)\tilde{g} - L(\rho)C\hat{g} \quad (24)$$

where, $\tilde{g} = (\tilde{g}_1 \; \tilde{g}_2 \; \tilde{g}_3 \; \tilde{g}_4)^T \equiv$ estimation error vector, At a fixed operating condition, the elements in the parameter vector p may all be constant, i.e., may not be time-varying. A Lyapunov function candidate may be chosen for the estimation error system (i.e., equations (23) and (24)):

$$V_o = \frac{1}{2}\tilde{g}_1^2 + \frac{1}{2}\tilde{g}_2^2 + \frac{1}{2}\tilde{g}_3^2 + \frac{1}{2}\tilde{g}_4^2. \quad (25)$$

It may be appreciated that $V_o$ may be equal to zero for $\tilde{g}=0$ and $V_o$ may approach infinity as $|\tilde{g}|$ approaches infinity. Accordingly, $V_o$ may be positive definite and radially unbounded. $V_o$ may have a first derivative:

$$V_o^{\&} = \tilde{g}_1\tilde{g}_1^{\&} + \tilde{g}_2\tilde{g}_2^{\&} + \tilde{g}_3\tilde{g}_3^{\&} + \tilde{g}_4\tilde{g}_4^{\&}. \quad (26)$$

Whether $V_o^{\&}$ is negative definite may be determined from analysis of engine operating conditions. First, equation (26) may be rewritten by substituting for $\tilde{g}^{\&}$ using equations (18) through (24) as:

$$V_o^{\&} = -k_6 W_{eo}\tilde{g}_1^2 = k_4 W_{HEGR}\tilde{g}_1\tilde{g}_4 + k_5 W_{LEGR}\tilde{g}_1\tilde{g}_2 - k_5 W_{ce}$$
$$\tilde{g}_2^2 - 0\tilde{g}_2\tilde{g}_4 + k_7 W_{ce}\tilde{g}_3\tilde{g}_2 - k_7 W_{HT}\tilde{g}_3^2 - k_4 W_{HT}\tilde{g}_3$$
$$\tilde{g}_4 + k_4 W_{HEGR}\tilde{g}_1\tilde{g}_4 + k_4 W_{HT}\tilde{g}_3\tilde{g}_4 - k_4(W_{HT} + W_{HEGR})$$
$$\tilde{g}_4^2 - l_4\tilde{g}_4^2 \quad (27)$$

then simplified:

$$V_o^{\&} = -k_6 W_{eo}\tilde{g}_1^2 + k_5 W_{LEGR}\tilde{g}_1\tilde{g}_2 - k_5 W_{ce}\tilde{g}_2^2 + k_7 W_{ce}\tilde{g}_3$$
$$\tilde{g}_2 - k_7 W_{HT}\tilde{g}_3^2 - k_4(W_{HT} + W_{HEGR})\tilde{g}_4^2 - l_4^2. \quad (28)$$

Attention is again directed to FIG. 1, and in particular, exhaust manifold 130, compressor 245 and LP-EGR valve 330. It may be appreciated that the following two inequalities may hold for all engine operating conditions:

$$W_{eo} > W_{LEGR} \quad (29)$$

and $$W_{ce} > W_{LEGR}. \quad (30)$$

$W_{eo}$, the mass air and/or EGR gas flow rate out of the cylinders 220a, b, c, or d, may be greater than the mass air and/or EGR gas flow rate through the LP-EGR valve 330. Turning to FIG. 1, $W_{eo}$ may flow out of a cylinder 220a, b, c, or d, into exhaust manifold 130. All or a portion of $W_{eo}$ may flow through turbine 235 into T channel 155. The portion of $W_{eo}$ in the T channel 155 may split and another portion may flow through LNT 255 and out exhaust channel 160 (i.e., tail pipe) and the remaining portion may flow through the LP-EGR valve as $W_{LEGR}$. It should be appreciated then, that the mass air and/or EGR gas flow through the LP-EGR valve 330 may be less than the mass air and/or EGR gas flow out of a cylinder 220a, b, c, or d.

It may be further appreciated that $W_{eo}$ may divide prior to flowing through the turbine 235. For example, when the HP-EGR valve 310 is open, a portion of $W_{eo}$ may flow from the exhaust manifold 130 through the HP-EGR channel 135 through the HP-EGR valve 310 to the intake manifold 110. In this case, the difference between $W_{eo}$ and $W_{LEGR}$ may be even greater. Accordingly, regardless of the position of the HP-EGR valve 310, $W_{eo}$ may be greater than $W_{LEGR}$ for all engine conditions.

$W_{ce}$, the mass and/or EGR gas flow rate out of the compressor 245 may also be greater than $W_{LEGR}$. The mass air flow sensor MAF 460 may sense fresh air flow from an inlet port (not shown) into compressor input channel 140. The inlet port may not include a throttle valve. Based on the dimensions of the compressor input channel 140 and the LP-EGR channel 145, $W_{LEGR}$ may be less than or at most, equal to, the fresh air flow, $W_{MAF}$. Accordingly, $W_{ce}$ may be greater than $W_{LEGR}$ for all engine operating conditions.

For the parameters $k_5$ and $k_6$, defined in equation (15), the following inequality may hold:

$$\frac{k_6}{k_5} = \frac{p_4 V_4 T_3}{p_3 V_3 T_4} > \frac{1}{2}. \quad (31)$$

In the embodiment depicted in FIG. 1, the volumes of section 3 (exhaust manifold 130) and section 4 (compressor input channel) may be approximately equivalent. The pressure, P4, measured by sensor 440 may be approximately equal to atmospheric pressure because of its proximity to the MAF 460 and the fresh air inlet port. The temperature, T4, measured by sensor 440 may be relatively close to inlet air temperature because of its proximity to the fresh air inlet port and the cooling of the recirculated air and/or EGR gas by LP-EGR cooler 250.

Figure 2:
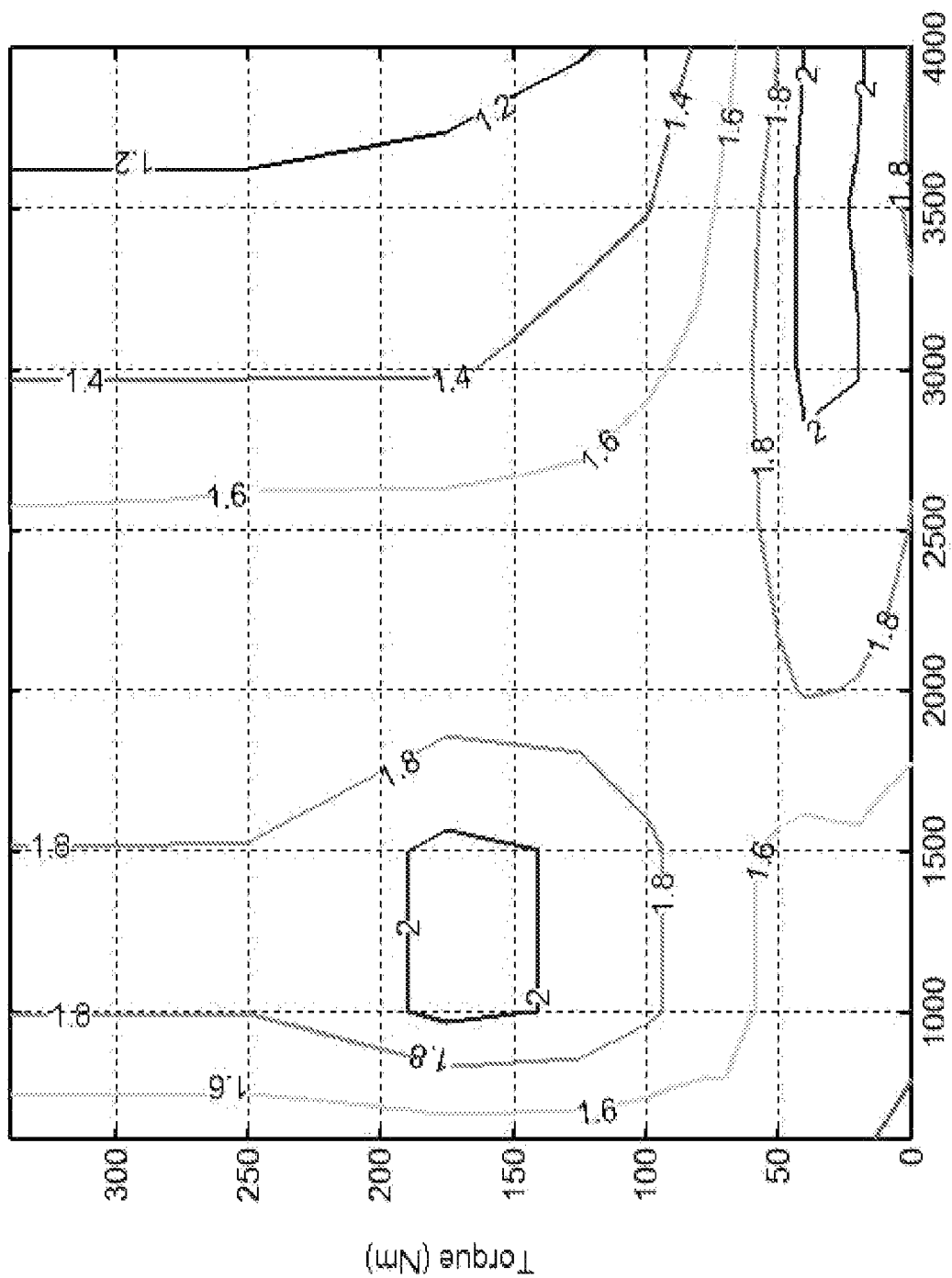
FIG. 2 depicts an exemplary plot of typical values for $k_6/k_5$ over an engine operating range.

Mathematical derivation of equation (31) may be difficult to obtain due to the complexity of the engine combustion process. However, the inequality may be shown based on empirical data. FIG. 2 illustrates the ratio of $k_6$ to $k_5$ over the operating range for an embodiment of an internal combustion engine as depicted in FIG. 1. It may be appreciated upon inspection of FIG. 2 that the inequality of equation (31) may be conservative. In the embodiment shown in FIG. 2, the ratio of $k_6$ to $k_5$ may actually be greater than one over the engine operating range.

Equations (29) through (31) may be combined to yield:

$$k_6 W_{eo} > \frac{1}{2} k_5 W_{LEGR} \quad (32)$$

and $$k_5 W_{ce} > k_5 W_{LEGR}. \quad (33)$$

Referring to FIG. 1, it may be appreciated that the mass air and/or EGR gas flow out of the compressor 245, $W_{ce}$, and the mass air and/or EGR gas flow through the HP-throttle, $W_{HT}$, may be similar. Both may flow in the intercooler channel 120 and in the embodiment depicted in FIG. 1, intercooler channel 120 may not have any branches. Accordingly, it should be appreciated that:

$$W_{HT} > \frac{1}{2} W_{ce}. \quad (34)$$

For the parameters $k_5$ and $k_7$, defined in equation (15), the following inequality may hold:

$$k_5 = \frac{RT_4}{p_4 V_4} > k_7 = \frac{RT_2}{p_2 V_2} \quad (35)$$

This inequality may be shown to hold based on consideration of a given engine. It is contemplated that, in general, $V_2 \gg V_4$. For example, in a test engine used for model validation (discussed below), $V_2$ was about 0.012 m³ (m=meter) and $V_4$ was about 0.0021 m³.

It may be appreciated that $p_2$ may be greater than or equal to $p_4$. Referring again to FIG. 1, $p_4$ may be measured in compressor input channel 140 at the input to the compressor 245. $p_2$ may be measured in intercooler channel 120, downstream of the compressor 245. In an embodiment $p_2$ may be measured between the intercooler 225 and the HP-throttle 320. For example, in the test engine used for model validation, $p_2$ was in the range of about 98 to about 250 kPa and $p_4$ was about 98 kPa. Accordingly, $p_2$ may be greater than or equal to $p_4$.

It may be further appreciated that $T_2$ may be approximately equal to $T_4$. In an embodiment, $T_4$ may be measured in compressor input channel 140 at the input to compressor 245. In an embodiment, $T_2$ may be measured in intercooler channel 120, downstream of the intercooler 225. It may be appreciated that the air and/or EGR gas that may flow from the compressor input channel 140 through the compressor 245 may increase in temperature as it is compressed. The air and/or EGR gas may then be cooled as it flows through the intercooler 225. Accordingly, the air and/or EGR gas that may enter the compressor 245 at temperature $T_4$, may leave the intercooler at temperature $T_2$, where $T_2$ may be approximately equal to $T_4$. For example, in the test engine used for model validation, $T_4$ was about 25° C. and $T_2$ was in the range of about 30° C. to about 40° C.

From the above physical insight into an internal combustion engine, along with illustrative data from a test engine, it should be appreciated that the inequality of equation (35) may hold for $k_5$ and $k_7$ as defined in equation (15).

Using algebraic manipulation, and considering the inequalities of equations (29) through (35), equation (28) may be rewritten as:

$$\dot{V}_o = -\left(k_6 W_{eo} - \frac{1}{2} k_5 W_{LEGR}\right) \tilde{g}_1^2 - \quad (36)$$
$$\frac{1}{2} k_5 W_{LEGR} (\tilde{g}_1 - \tilde{g}_2)^2 - \left(\frac{1}{2} k_5 W_{ce} - \frac{1}{2} k_5 W_{LEGR}\right) \tilde{g}_2^2 -$$
$$\left(\frac{1}{2} k_5 W_{ce} - \frac{1}{2} k_7 W_{ce}\right) \tilde{g}_2^2 - \frac{1}{2} k_7 W_{ce} (\tilde{g}_2 - \tilde{g}_3)^2 -$$
$$\left(k_7 W_{HT} - \frac{1}{2} k_7 W_{ce}\right) \tilde{g}_3^2 - [k_4 (W_{HT} + W_{HEGR}) + l_4] \tilde{g}_4^2$$

which through further algebraic manipulation may be rewritten as:

$$\dot{V}_o = -\left(k_6 W_{eo} - \frac{1}{2} k_5 W_{LEGR}\right) \tilde{g}_1^2 - \quad (37)$$
$$\frac{1}{2} k_5 W_{LEGR} (\tilde{g}_1 - \tilde{g}_2)^2 - \left(\frac{1}{2} k_5 W_{ce} - \frac{1}{2} k_5 W_{LEGR}\right) \tilde{g}_2^2 -$$
$$\left(\frac{1}{2} k_5 W_{ce} - \frac{1}{2} k_7 W_{ce}\right) \tilde{g}_2^2 - \frac{1}{2} k_7 W_{ce} (\tilde{g}_2 - \tilde{g}_3)^2 -$$
$$\left(k_7 W_{HT} - \frac{1}{2} k_7 W_{ce}\right) \tilde{g}_3^2 - [k_4 (W_{HT} + W_{HEGR}) + l_4] \tilde{g}_4^2$$

By inspection of equation (37) and consideration the inequalities of equations (29) through (35), it may be appreciated that equation (37) may be negative definite. In other words, $\dot{V}_o = 0$ for $\tilde{g} = 0$ and $\dot{V}_o < 0$ $\tilde{g} \neq 0$.

Accordingly, since the Lyapunov function candidate, $V_o$, of the estimate error, $\tilde{g}$, may be positive definite and radially unbounded and its first derivative, $\dot{V}_o$, may be negative definite, the estimate error system may be asymptotically stable. In other words, the estimation errors may asymptotically converge to zero as time approaches infinity. Stated another way, the estimated air fractions, $\hat{F}_1$, $\hat{F}_2$, $\hat{F}_3$, and $\hat{F}_4$, may converge to the actual air fractions $F_1$, $F_2$, $F_3$, and $F_4$, respectively, as time approaches infinity.

FIGS. 3A through 3D and 4A through 4D illustrate experimental results for an exemplary test engine equipped with an embodiment of a dual loop EGR system consistent with the present disclosure. The test engine was a 2.2 L light duty 4-cylinder common rail diesel engine. The engine speed during the experiments was approximately 1750 rpm. The observer was implemented on a QNX real-time Rapid Prototyping Electronic Control System (RPECS®) that replaced the original equipment engine control unit (ECU). The sample period for the controller was about 5 msec.

Figure 3A:
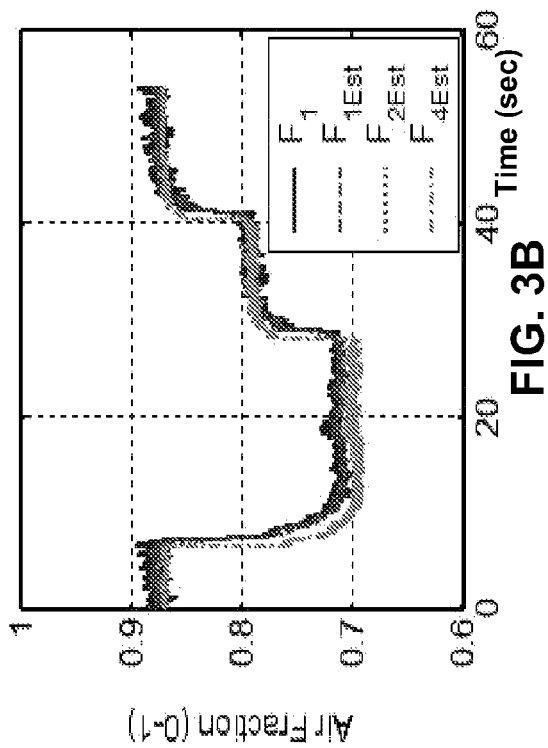
FIGS. 3A through 3D illustrate observer estimation results when the high pressure EGR valve is closed and the low pressure EGR valve position is varied.
Figure 3B:
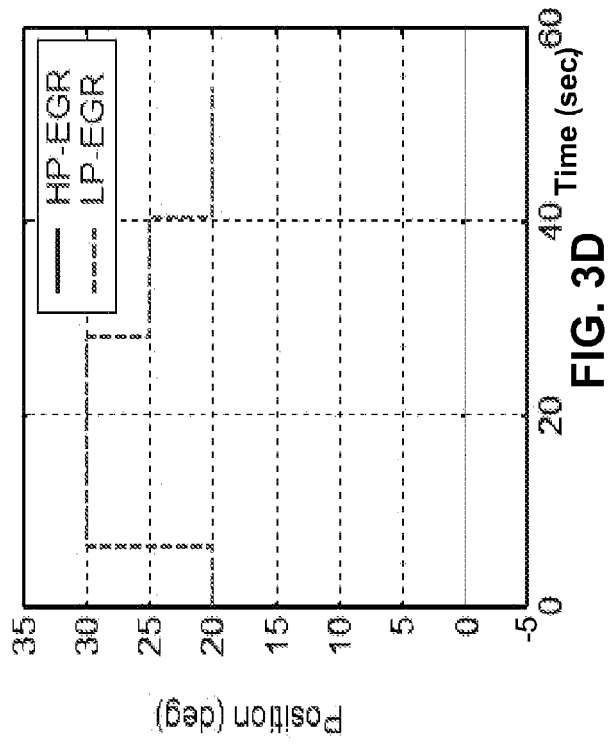
Figure 3C:
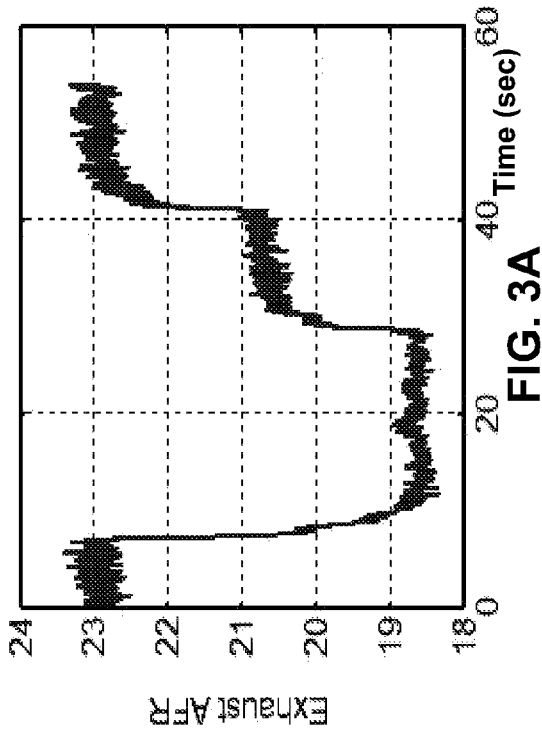
Figure 3D:
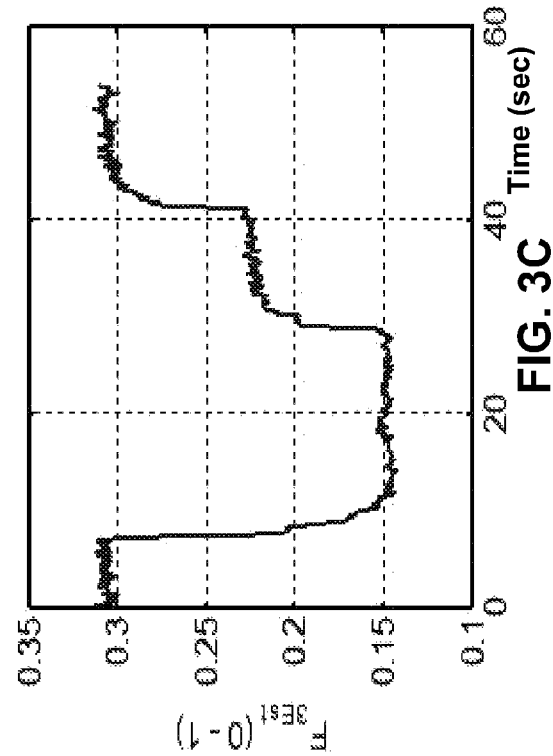

FIG. 3D illustrates the positions of the HP-EGR valve, e.g., HP-EGR valve 310 and the LP-EGR valve, e.g., LP-EGR valve 330. HP-EGR valve 310 was maintained in a closed position while the LP-EGR valve position was varied between about twenty degrees and about thirty degrees. Zero degrees may correspond to a fully closed valve while ninety degrees may correspond to a fully open valve. As shown in FIG. 3D, the LP-EGR valve position was changed in a stepwise manner. This valve position characteristic was chosen, in part, because the stability analysis above assumed generally constant engine conditions.

FIGS. 3B and 3C illustrate a measured and/or calculated air fraction in the intake manifold 110 ($F_1$) and the estimated air fractions in the intake manifold 110 ($\hat{F}_1$), the intercooler channel 120 ($\hat{F}_2$), the exhaust manifold 130 ($\hat{F}_3$) and the compressor input channel 140 ($\hat{F}_4$). It may be appreciated that the estimated air fractions track the position of the LP-EGR valve and converge to an approximately steady state value between switching points. It may be further appreciated that $\hat{F}_4$ may lead the other air fraction estimates which may be expected since the compressor input channel 140 (where $\hat{F}_4$ is determined) is located nearest the LP-EGR valve 330. Accordingly, $\hat{F}_4$ may respond relatively more quickly to changes in the position of LP-EGR valve.

With no contribution from the HP-EGR loop, $\hat{F}_2$ may be nearly indistinguishable from $\hat{F}_1$, which may be as expected. $\hat{F}_1$ and $F_1$ may also be indistinguishable suggesting that the observer may estimate the air fraction in the intake manifold with estimation error that approaches zero as time approaches infinity. In the steady state regions, $\hat{F}_4$ may also be indistinguishable from $\hat{F}_1$, which also may be as expected. Referring to FIG. 1, with the HP-EGR valve 310 closed air and/or EGR gas may flow from the compressor input channel 140 to the intake manifold 110 without receiving or losing air or EGR gas. Accordingly, the air fractions (i.e., $F_1$, $F_2$, $F_4$) should be approximately equivalent for these sections.

Comparing FIGS. 3D and 3B, it may be appreciated that there may be an inverse relationship between the air fractions and the LP-EGR valve position. In other words, as the valve opening increases, the actual and estimated air fractions may decrease. This may be as expected since as the valve opening increases, the amount of exhaust gas that may be recirculated may increase thereby reducing the amount of air present.

FIG. 3C illustrates the estimated exhaust manifold 130 air fraction, $\hat{F}_3$, and FIG. 3A illustrates the exhaust air to fuel ratio. It may be appreciated that the estimated air fraction in the exhaust manifold 130 may be relatively less than the air fractions in the other sections, i.e., intake manifold 110, intercooler channel 120 and compressor input channel 140. This may be as expected since these sections may have added air from the air intake port (not shown) that may mix with the air and/or LP-EGR gas that may be present in the compressor input channel 140.

The exhaust AFR may also track the LP-EGR valve position. The exhaust AFR may be based on the oxygen that may be present in the exhaust gas, e.g., based on data from UEGO 470. It may be appreciated from FIG. 3A that the air to fuel ratio, as determined by the exhaust AFR, may decrease as the amount of exhaust gas recirculated increases, i.e., as the LP-EGR valve opening increases. This may be as expected since the test engine fuel air mix was lean, i.e., more air than the stoichiometric amount. Combustion may have been complete, i.e., all fuel was consumed during combustion. Therefore, as the air fraction into the cylinders ($F_1$) may have been decreased by increasing the amount of recirculating EGR gas, the amount of air present in the exhaust also decreased.

Figure 4A:
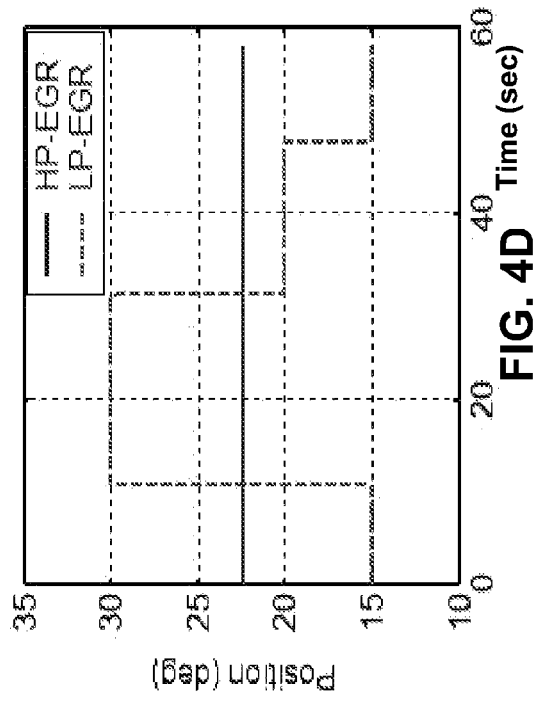
FIGS. 4A through 4D illustrate observer estimation results when the high pressure EGR valve is open but not varied and the position of the low pressure EGR valve is varied.
Figure 4B:
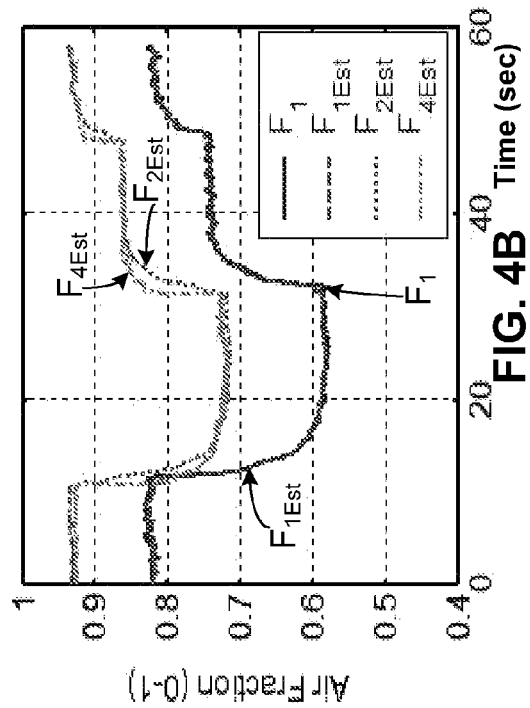
Figure 4C:
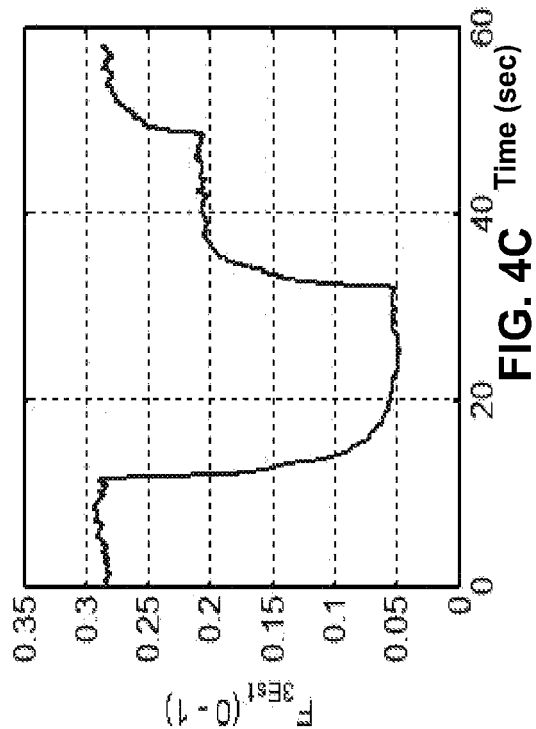
Figure 4D:
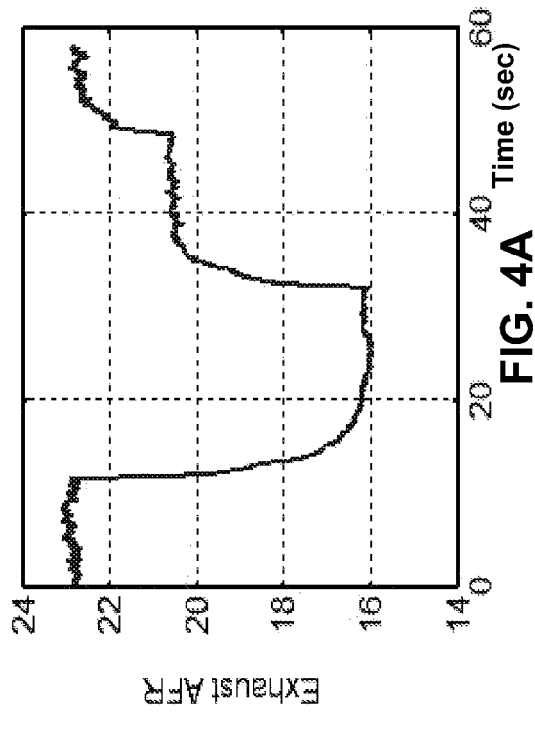

Attention is directed to FIGS. 4A through 4D. FIG. 4D illustrates the positions of the HP-EGR valve 310 and the LP-EGR valve 330. Unlike FIGS. 3A through 3D, HP-EGR valve 310 position was open about 22.5 degrees for the experimental results illustrated in FIGS. 4A through 4D. The LP-EGR valve 330 position was varied between about fifteen and about thirty degrees, in step-wise fashion.

Similar to the results illustrated in FIGS. 3A through 3D, the model (i.e., estimated air fractions) tracks the changes in LP-EGR valve 330 position and converges to actual values. FIG. 4B illustrates the contribution of the HP-EGR loop on both the estimated and actual intake manifold 110 air fractions (i.e., $\hat{F}_1$, $F_1$). It may be appreciated the plots of the estimated and actual intake manifold 110 air fractions are nearly indistinguishable. This may indicate that the model may accurately estimate the air fractions under both transient and steady state conditions.

The estimated and actual intake manifold 110 air fractions may be relatively less than the estimated air fractions in the intercooler channel 120 and the compressor input channel 140, $\hat{F}_2$, $\hat{F}_4$, respectively. This may be as expected since the HP-EGR valve 310 may provide a relatively direct path between the exhaust manifold 130 and the intake manifold 110. This path may allow relatively more exhaust gas to mix with the air and/or EGR gas from the LP-EGR loop and the air intake port (not shown) when compared to the case where the HP-EGR valve 310 is closed (e.g., FIG. 3B). Similarly, both the measured and/or calculated exhaust AFR and the estimated exhaust manifold air fraction illustrated in FIGS. 4A and 4C, respectively, indicate relatively smaller minimum values when compared to those illustrated in FIGS. 3A and 3C.

It should be appreciated that FIGS. 3A through 3D and FIGS. 4A through 4D provide test data that may validate embodiments of the model and/or method described in the present disclosure. The observer may provide estimates of air fractions in sections of an internal combustion engine system, e.g., system 100, in real time. An observer output, i.e., $\hat{F}_1$, may converge to the actual system value as time goes to infinity thereby indicating that the observer may be stable.

Figure 5:
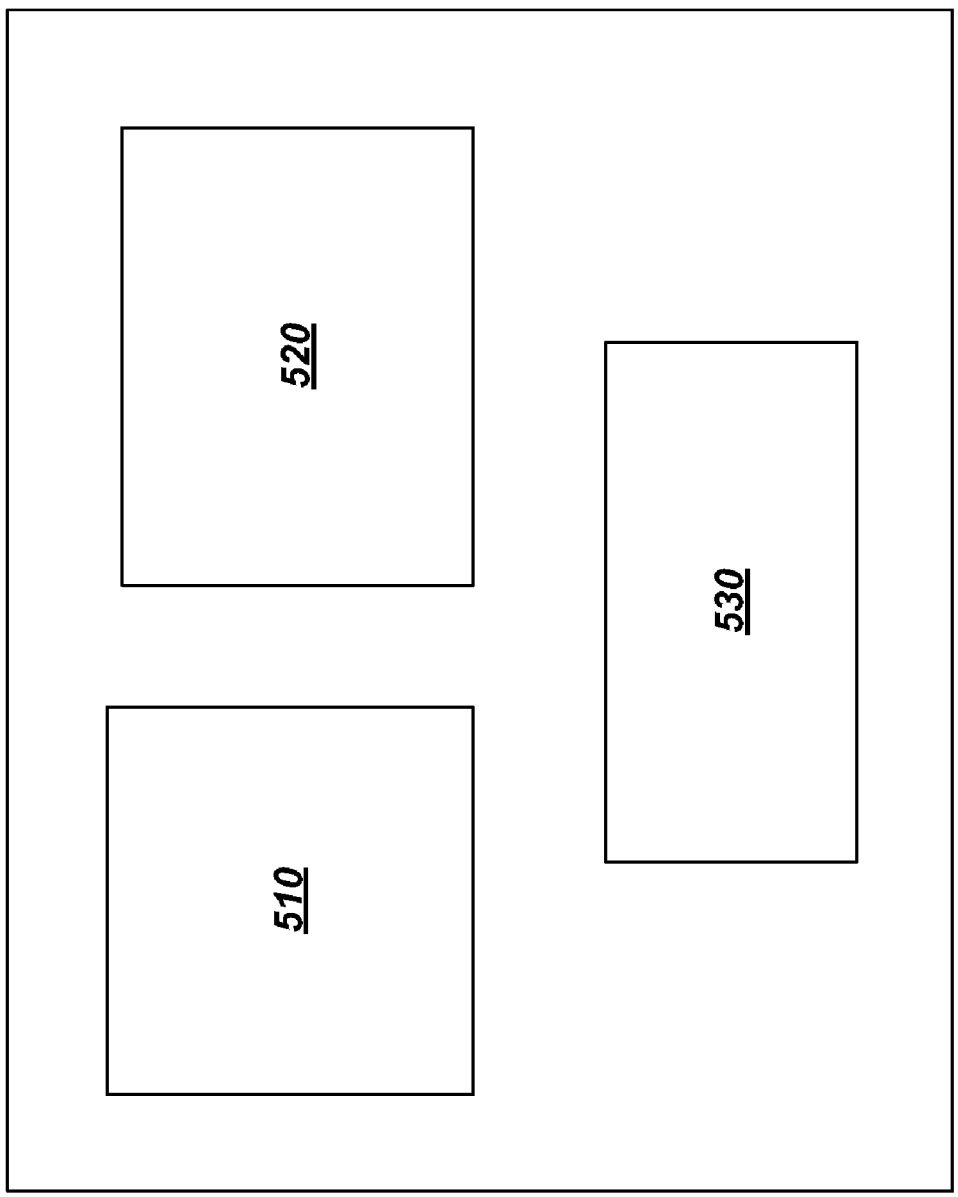
FIG. 5 illustrates an example of a system herein for estimating air fractions that contains a processor, machine readable media and a user interface.

It should also be appreciated that the functionality described herein for the embodiments of the present invention may be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 5, the system for estimating air fractions for diesel engines with dual-loop EGR systems may contain a processor (510) and machine readable media (520) and user interface (530).

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. A method for estimating air fractions in an internal combustion engine having an intake manifold, exhaust manifold, intercooler channel, compressor input channel and a dual-loop exhaust gas recirculation system, comprising:
    (a) receiving information comprising pressure, temperature, mass air flow, fuel mass flow rate, exhaust gas air to fuel ratio, valve position and engine speed;
    (b) generating output signals based upon said information and estimating:
        air fraction ($\hat{F}_1$) in the intake manifold;
        air fraction ($\hat{F}_2$) in the intercooler channel;
        air fraction ($\hat{F}_3$) in the exhaust manifold; and
        air fraction ($\hat{F}_4$) in the compressor input channel
    (c) comparing at least one of said estimated air fractions to a measured air fraction;
    (d) determining a difference in at least one of said estimated air fractions to said measured air fraction; and
    (e) repeating steps (a)-(e) based upon the difference identified in step (d).

2. The method of claim 1, wherein said internal combustion engine includes a high pressure throttle valve and adjusting said high pressure throttle valve based upon at least one of said estimated air fraction information.

3. The method of claim 1 wherein said internal combustion engine includes a low pressure EGR valve and a high pressure EGR valve and adjusting said low and high pressure EGR valves based upon at least one of said estimated air fraction information.

4. The method of claim 1 wherein said step of estimating said air fractions $\hat{F}_1$, $\hat{F}_2$, $\hat{F}_3$, and $\hat{F}_4$ comprises estimating all of said air fractions according to the following relationships:

$$\dot{\hat{g}} = A(\rho)\hat{g} + W(\rho) + L(\rho)(z-\hat{z})$$

$$\hat{z} = C\hat{g}$$

where, $$\dot{\hat{g}} = \begin{pmatrix} \dot{\hat{F}_3} \\ \dot{\hat{F}_4} \\ \dot{\hat{F}_2} \\ \dot{\hat{F}_1} \end{pmatrix},$$

$$A(\rho) = \begin{pmatrix} -k_6 W_{eo} & 0 & 0 & 0 \\ k_5 W_{LEGR} & -k_5 W_{ce} & 0 & 0 \\ 0 & k_7 W_{ce} & -k_7 W_{HT} & 0 \\ k_4 W_{HEGR} & 0 & k_4 W_{HT} & -k_4(W_{HT}+W_{HEGR}) \end{pmatrix},$$

$$\hat{g} = \begin{pmatrix} \hat{F}_3 \\ \hat{F}_4 \\ \hat{F}_2 \\ \hat{F}_1 \end{pmatrix}, W(\rho) = \begin{pmatrix} k_6 W_{eo} F_{eo} \\ k_5 W_{MAF} \\ 0 \\ 0 \end{pmatrix}, C = (0\ 0\ 0\ 1),$$

$\rho = (k_4 k_5 k_6 k_7 W_{eo} W_{LEGR} W_{ce} W_{HEGR} W_{HT} F_{eo} W_{MAF})$, and $L(\rho) = (k_4 W_{HEGR} 0 k_4 W_{HT} l_4)^T$, $l_4 > 0$.

5. The method of claim 1 wherein said measured air fraction comprises a calculated air fraction at the intake manifold.

6. The method of claim 5 wherein said calculated air fraction at the intake manifold if calculated according to the following relationship:

$$F_1 = \frac{W_f \lambda_m}{W_e}$$

wherein $W_f$ is the fuel mass flow rate, $\lambda_m$ is the exhaust gas air to fuel ratio, and $W_e$ is the intake manifold air and/or EGR flow rate.

7. The method of claim 1 wherein said dual-loop exhaust gas recirculation system comprises a relatively high pressure loop and a relatively low pressure loop.

8. The method of claim 1 wherein said fuel comprises a hydrocarbon fuel.

9. An engine control unit for estimating air fractions in an internal combustion engine having an intake manifold, exhaust manifold, intercooler channel, compressor input channel and a dual-loop exhaust gas recirculation system, comprising a processor configured to:
  (a) receive information comprising pressure, temperature, mass air flow, fuel mass flow rate, exhaust gas air to fuel ratio, valve position and engine speed;
  (b) generate output signals based upon said information and estimating:
    air fraction ($\hat{F}_1$) in the intake manifold;
    air fraction ($\hat{F}_2$) in the intercooler channel;
    air fraction ($\hat{F}_3$) in the exhaust manifold; and
    air fraction ($\hat{F}_4$) in the compressor input channel
  (c) compare at least one of said estimated air fractions to a measured air fraction;
  (d) determine a difference in at least one of said estimated air fractions to said measured air fraction; and
  (e) repeat steps (a)-(e) based upon the difference identified in step (d).

10. The engine control unit of claim 9, wherein said internal combustion engine includes a high pressure throttle valve and said control unit is configured to adjust said high pressure throttle valve based upon at least one of said estimated air fraction information.

11. The engine control unit of claim 9 wherein said internal combustion engine includes a low pressure EGR valve and a high pressure EGR valve and said engine control unit is configured to adjust said low and high pressure EGR valves based upon at least one of said estimated air fraction information.

12. The engine control unit of claim 9 wherein said measured air fraction comprises a calculated air fraction at the intake manifold.

13. The engine control unit of claim 9 wherein said calculated air fraction at the intake manifold if calculated according to the following relationship:

$$F_1 = \frac{W_f \lambda_m}{W_e}$$

wherein $W_f$ is the fuel mass flow rate, $\lambda_m$ is the exhaust gas air to fuel ratio, and $W_e$ is the intake manifold air and/or EGR flow rate.

14. The engine control unit of claim 9 wherein said dual-loop exhaust gas recirculation system comprises a relatively high pressure loop and a relatively low pressure loop.

15. The engine control unit of claim 9 wherein said fuel comprises a hydrocarbon fuel.

16. An article comprising a storage medium having stored thereon instructions that when executed by a machine result in the following operations in an internal combustion engine having an intake manifold, exhaust manifold, intercooler channel, compressor input channel and a dual-loop exhaust gas recirculation system:
  (a) receiving information comprising pressure, temperature, mass air flow, fuel mass flow rate, exhaust gas air to fuel ratio, valve position and engine speed;
  (b) generating output signals based upon said information and estimating:
    air fraction ($\hat{F}_1$) in the intake manifold;
    air fraction ($\hat{F}_2$) in the intercooler channel;
    air fraction ($\hat{F}_3$) in the exhaust manifold; and
    air fraction ($\hat{F}_4$) in the compressor input channel
  (c) comparing at least one of said estimated air fractions to a measured air fraction;
  (d) determining a difference in at least one of said estimated air fractions to said measured air fraction; and
  (e) repeating steps (a)-(e) based upon the difference identified in step (d).

17. The article of claim 16, wherein said internal combustion engine includes a high pressure throttle valve including the operation of adjusting said high pressure throttle valve based upon at least one of said estimated air fraction information.

18. The article of claim 16 wherein said internal combustion engine includes a low pressure EGR valve and a high pressure EGR valve including the operation of adjusting said low and high pressure EGR valves based upon at least one of said estimated air fraction information.

19. The article of claim 16 wherein said step of estimating said air fractions $\hat{F}_1$, $\hat{F}_2$, $\hat{F}_3$, and $\hat{F}_4$ comprises estimating all of said air fractions according to the following relationships:

$$\dot{\hat{g}} = A(\rho)\hat{g} + W(\rho) + L(\rho)(z-\hat{z})$$

$$\hat{z} = C\hat{g}$$

where, $$\dot{\hat{g}} = \begin{pmatrix} \dot{\hat{F}}_3 \\ \dot{\hat{F}}_4 \\ \dot{\hat{F}}_2 \\ \dot{\hat{F}}_1 \end{pmatrix},$$

$$A(\rho) = \begin{pmatrix} -k_6 W_{eo} & 0 & 0 & 0 \\ k_5 W_{LEGR} & -k_5 W_{ce} & 0 & 0 \\ 0 & k_7 W_{ce} & -k_7 W_{HT} & 0 \\ k_4 W_{HEGR} & 0 & k_4 W_{HT} & -k_4(W_{HT}+W_{HEGR}) \end{pmatrix},$$

$$\hat{g} = \begin{pmatrix} \hat{F}_3 \\ \hat{F}_4 \\ \hat{F}_2 \\ \hat{F}_1 \end{pmatrix}, W(\rho) = \begin{pmatrix} k_6 W_{eo} F_{eo} \\ k_5 W_{MAF} \\ 0 \\ 0 \end{pmatrix}, C = (0\ 0\ 0\ 1),$$

$$\rho = (k_4 k_5 k_6 k_7 W_{eo} W_{LEGR} W_{ce} W_{HEGR} W_{HT} F_{eo} W_{MAF})^T,$$

and $$L(\rho) = (k_4 W_{HEGR}\ 0\ k_4 W_{HT}\ l_4)^T, l_4 > 0.$$

20. The article of claim 16 wherein said measured air fraction comprises a calculated air fraction at the intake manifold.

* * * * *